United States Patent
Leigh

(10) Patent No.: US 7,422,622 B2
(45) Date of Patent: Sep. 9, 2008

(54) SUPPLYING SOLID FEED MATERIALS FOR A DIRECT SMELTING PROCESS

(75) Inventor: David John Leigh, Kensington (AU)

(73) Assignee: Technologies Resources Pty Ltd., Melbourne (AU)

(*) Notice: Subject to any disclaimer, the term of this patent is extended or adjusted under 35 U.S.C. 154(b) by 63 days.

(21) Appl. No.: 11/030,078

(22) Filed: Jan. 7, 2005

(65) Prior Publication Data
US 2005/0127581 A1 Jun. 16, 2005

Related U.S. Application Data

(62) Division of application No. 10/267,037, filed on Oct. 9, 2002, now Pat. No. 6,989,126.

(30) Foreign Application Priority Data
Oct. 9, 2001 (AU) .................................. PR8172

(51) Int. Cl.
*C21C 1/00* (2006.01)
*C21C 5/35* (2006.01)
(52) U.S. Cl. .......................................... 75/531; 75/558
(58) Field of Classification Search ............... 266/83, 266/176, 225; 75/414, 503
See application file for complete search history.

(56) References Cited

U.S. PATENT DOCUMENTS 3,178,164 A * 4/1965 Schulte et al. .............. 266/137
3,301,544 A * 1/1967 Eft et al. ....................... 266/82
4,519,587 A 5/1985 Peckels et al. ................ 266/80
5,324,341 A * 6/1994 Nagel et al. .................. 75/503
5,516,356 A 5/1996 Schmit et al. ................ 75/387
5,788,921 A * 8/1998 Gitman et al. .............. 266/225

(Continued)

FOREIGN PATENT DOCUMENTS

JP     62224619 A     2/1987

(Continued)

OTHER PUBLICATIONS

Machine translation of JP 2001-063823 into English.*

(Continued)

*Primary Examiner*—Roy King
*Assistant Examiner*—Tima M McGuthry-Banks
(74) *Attorney, Agent, or Firm*—Miles & Stockbridge P.C.; David R. Schaffer, Esq.

(57) ABSTRACT

A process and apparatus for supplying solid feed materials for a direct smelting process to solids injection lances of a direct smelting vessel is disclosed. The feed materials supply apparatus includes a supply line (L) for conveying iron-containing material and solid carbonaceous material under pressure to solids injection lances (7), and the supply line includes a main feeder line section (15) and a plurality of branch line sections (17) extending from the main feeder line section. Each branch line section is connected to one solids injection lance for supplying iron-containing material and carbonaceous material to that lance. The apparatus further includes an assembly for dispensing iron-containing material under pressure into the main feeder line section of the supply line and an assembly for dispensing carbonaceous material under pressure into the main feeder line section of the supply line.

9 Claims, 3 Drawing Sheets

U.S. PATENT DOCUMENTS

| | | | | |
|---|---|---|---|---|
| 5,811,057 | A | * | 9/1998 | Hubble et al. ............... 266/275 |
| 6,428,603 | B1 | | 8/2002 | Batterham ................... 75/533 |
| 6,482,249 | B1 | * | 11/2002 | Dry ............................. 75/502 |
| 2004/0256773 | A1 | * | 12/2004 | Dry et al. .................... 266/195 |
| 2004/0262823 | A1 | * | 12/2004 | Ions et al. ................... 266/195 |
| 2006/0119020 | A1 | * | 6/2006 | Burke et al. ................ 266/144 |

FOREIGN PATENT DOCUMENTS

| | | | |
|---|---|---|---|
| JP | 09-324205 | * | 12/1997 |
| JP | 2001-063823 | * | 3/2001 |
| WO | WO 01/04030 | * | 1/2001 |

OTHER PUBLICATIONS

English abstract of JP 09-324205.*

M. Birk et al., "Video Monitoring of Pulverized Coal Injection in the Blast Furnance", Conference Record of the 2001 IEEE Industry Applications Conference, 36th IAS Annual Meeting, Chicago, IL, Sep. 30-Oct. 4, 2001, vol. 1 of 4, Conf. 36, Sep. 30, 2001, pp. 1354-1358, XP010561870 ISBN: 0-7803-7114-3.

B.L. Cusack et al. "Initial Operation of the Hismelt Research and Development Facility", Iron and Steelmaker, Warrendale, WA, US, vol. 22, No. 2 Feb. 1995, pp. 13-20, XP009008584 ISSN: 0275-8687.

R.J. Dry et al. "HISMELT—The Future in Direct Ironmaking", Ironmaking Conference Proceedings, vol. 58, 1999, pp. 361-366, XP001147860.

JP 62 224619A (Nippon Steel Corp) Oct. 2, 1987 and abstracts of Japan vol. 0120, No. 2 (C-483), Mar. 25, 1988.

Feinman, J., Chapter 11 "Direct Reduction and Smelting Process", Ironmaking vol. 1999, pp. 741-780, The AISE Steel Foundation, Pittsburgh, PA.

* cited by examiner

SUPPLYING SOLID FEED MATERIALS FOR A DIRECT SMELTING PROCESS

CROSS REFERENCE TO RELATED APPLICATIONS

This application is a divisional of application U.S. patent application Ser. No. 10/267,037 filed Oct. 9, 2002, now U.S. Pat. No. 6,989,126, which claims priority to Australian application No. PR 8172 filed Oct. 9, 2001.

BACKGROUND OF THE INVENTION

1. Field of the Invention

The present invention relates to a process and an apparatus for supplying solid feed materials for a direct smelting process to solids injection lances of a direct smelting vessel.

2. Description of Related Art

A known direct smelting process that is generally referred to as the HIsmelt process is described in International Application PCT/AU96/00197 (WO96/31627) and in other patent applications in the name of the applicant.

The following discussion of the HIsmelt process is not to be taken as an admission of common general knowledge.

The HIsmelt process includes the steps of:
(a) forming a molten bath of iron and slag in a vessel;
(b) injecting into the bath:
  (i) an iron-containing feed material, typically iron ore or partially reduced iron ore; and
  (ii) a solid carbonaceous material, typically coal, which acts as a reductant of the iron-containing feed material and a source of energy; and
(c) smelting iron-containing feed material to iron in the bath.

The term "smelting" is herein understood to mean thermal processing wherein chemical reactions that reduce iron-containing material take place to produce molten iron.

The iron-containing feed material and the solid carbonaceous material are injected into the molten bath through a number of solids injection lances which are inclined to the vertical so as to extend downwardly and inwardly through the side wall of the vessel and into the lower region of the vessel so as to deliver the solids materials deep into the molten bath.

The HIsmelt process also includes post-combusting reaction gases, such as CO and $H_2$, that are released from the bath into a space above the bath with oxygen-containing gas and transferring the heat generated by post-combustion to the bath to contribute to the thermal energy required to smelt iron-containing feed material.

Typically, the oxygen-containing gas is a blast of hot air, which may be oxygen enriched, that is injected into an upper region of the vessel through a downwardly extending hot air injection lance. Offgases resulting from post-combustion of reaction gases in the vessel are taken away from an upper part of the vessel through an offgas duct.

The HIsmelt process enables large quantities of molten iron to be produced by direct smelting in a single compact vessel.

However, in order to achieve this it is necessary to supply large quantities of solid feed materials, namely iron-containing feed material, carbonaceous material, and fluxes, to the solids injection lances.

The supply of solid feed materials must continue throughout a smelting campaign, which desirably is at least 12 months.

Moreover, it must be possible to vary the supply of solid feed materials during the course of a smelting campaign to accommodate different operating conditions, including unexpected perturbations in the process, at different stages of a smelting campaign.

SUMMARY OF THE INVENTION

The present invention provides an effective and reliable process and apparatus for supplying solid feed materials to solids injection lances during a HIsmelt smelting campaign.

According to the present invention there is provided an apparatus for supplying solid feed materials for a direct smelting process to solids injection lances of a direct smelting vessel, the feed materials supply apparatus including:
(a) a supply line for conveying iron-containing material and solid carbonaceous material under pressure to solids injection lances, the supply line including a main feeder line section and a plurality of branch line sections extending from the main feeder line section, with each branch line section being connected to one solids injection lance for supplying iron-containing material and carbonaceous material to that lance;
(b) an assembly for dispensing iron-containing material under pressure into the main feeder line section of the supply line;
(c) an assembly for dispensing carbonaceous material under pressure into the main feeder line section of the supply line.

The term "iron-containing material" includes iron ore, partially reduced iron ore, DRI, and iron-containing wastes produced in steelmaking plants.

The term "carbonaceous material" includes coal and coke breeze.

Preferably the iron-containing material dispensing assembly includes a pressurised vessel that contains iron-containing material.

Preferably the iron-containing material dispensing assembly includes a means for controlling the flow rate of iron-containing material to the supply line.

Preferably the iron-containing material dispensing assembly includes a means for supplying carrier gas to transport iron-containing material under pressure into the supply line.

Preferably the carbonaceous material dispensing assembly includes a pressurised vessel that contains carbonaceous material.

Preferably the carbonaceous material dispensing assembly includes a means for controlling the flow rate of carbonaceous material to the supply line.

Preferably the carbonaceous material dispensing assembly includes a means for supplying carrier gas to transport carbonaceous material under pressure into the supply line.

Preferably the apparatus includes an assembly for dispensing flux under pressure into the main feeder line section of the supply line.

Preferably the flux dispensing assembly includes a pressurised vessel that contains flux.

Preferably the flux dispensing assembly includes a means for controlling the flow rate of flux into the supply line.

Preferably the flux dispensing assembly includes a means for supplying carrier gas to transport flux under pressure into the supply line.

Preferably each dispensing assembly is connected to the main feeder line section of the supply line at a different connection location along the main feeder line section.

Preferably the connection of the carbonaceous material dispensing assembly to the main feeder line section is upstream of the connection of the iron-containing material dispensing assembly to the main feeder line section.

Preferably the connection of the flux dispensing assembly to the main feeder line section is intermediate the connections of the carbonaceous material dispensing assembly to the iron-containing material dispensing assembly and the main feeder line section.

Preferably each branch line section is substantially the same in terms of configuration, ie straight sections and bends and pipe dimeter(s) in the branch line sections.

Preferably the supply line includes only two branch line sections.

With this arrangement, preferably the branch line sections are connected to a pair of lances at diametrically opposed locations on the vessel.

Preferably each branch line section includes a straight section that is connected to the solids injection lance and the length of the straight section is at least 10 times the diameter of the straight section.

Preferably the apparatus includes a means for detecting and unblocking blockages in the supply line.

Preferably the detecting/unblocking apparatus includes a plurality of assemblies for selectively pressurising or venting the supply line at a series of locations along the length of the supply line.

Preferably the apparatus includes a plurality of the above-described supply lines, with the branch line sections of each supply line being connected to solids injection lances, and with separate dispensing assemblies for iron-containing material and carbonaceous material and optionally flux being connected to each supply line.

With this arrangement, if there is a blockage or other interruption to the supply of feed materials in one or more of the supply lines, it is still possible to continue supplying feed materials to the vessel via the remaining unaffected and operational supply line or lines and solids injection lances connected to the supply line or lines.

According to the present invention there is also provided a process for supplying solid feed materials for a direct smelting process to solids injection lances of a direct smelting vessel, the process including the step of supplying solid feed materials and carrier gas to a plurality of solids injection lances via a supply line that has a main feeder line section and a plurality of branch line sections extending from the main feeder line section, with each branch line being connected to one of the lances.

Preferably the process includes maintaining the same mass flow rate of solid feed materials to each lance.

Preferably the solid feed materials include one or more of iron-containing material, carbonaceous material, and flux.

Preferably the iron-containing material is substantially fine material of less than 6 mm diameter.

Preferably the carbonaceous material is substantially fine material of less than 3 mm diameter.

Preferably the carrier gas is nitrogen.

Preferably the process includes supplying solid feed materials and carrier gas into the main feeder line section via separate dispensing assemblies for each feed material.

Preferably the process includes maintaining a pressure head of at least 250 Pa at the dispensing assembly end of the main feeder line section of the supply line.

Preferably the process includes maintaining a pressure head of at least 300 Pa at the dispensing assembly end of the main feeder line section of the supply line.

Preferably the process includes supplying solid feed materials and carrier gas in the supply line at a solids:gas ratio of at least 10 kg solids/$Nm^3$ gas.

Preferably the process includes supplying the following feed materials into the supply line at the following minimum velocities.

| Material | Minimum Velocity m/s |
|---|---|
| Coal/coke breeze | 8 |
| Ore/partially reduced iron ore DRI/steel plant wastes | 10 |
| Flux | 8 |

According to the present invention there is also provided a direct smelting apparatus that includes the above-described feed materials supply apparatus.

According to the present invention there is also provided a direct smelting process that includes the above-described process for supplying solid feed materials.

The present invention is described further by way of example with reference to the accompanying drawings of which:

DETAILED DESCRIPTION OF THE PRERERED EMBODIMENTS

Figure 1:
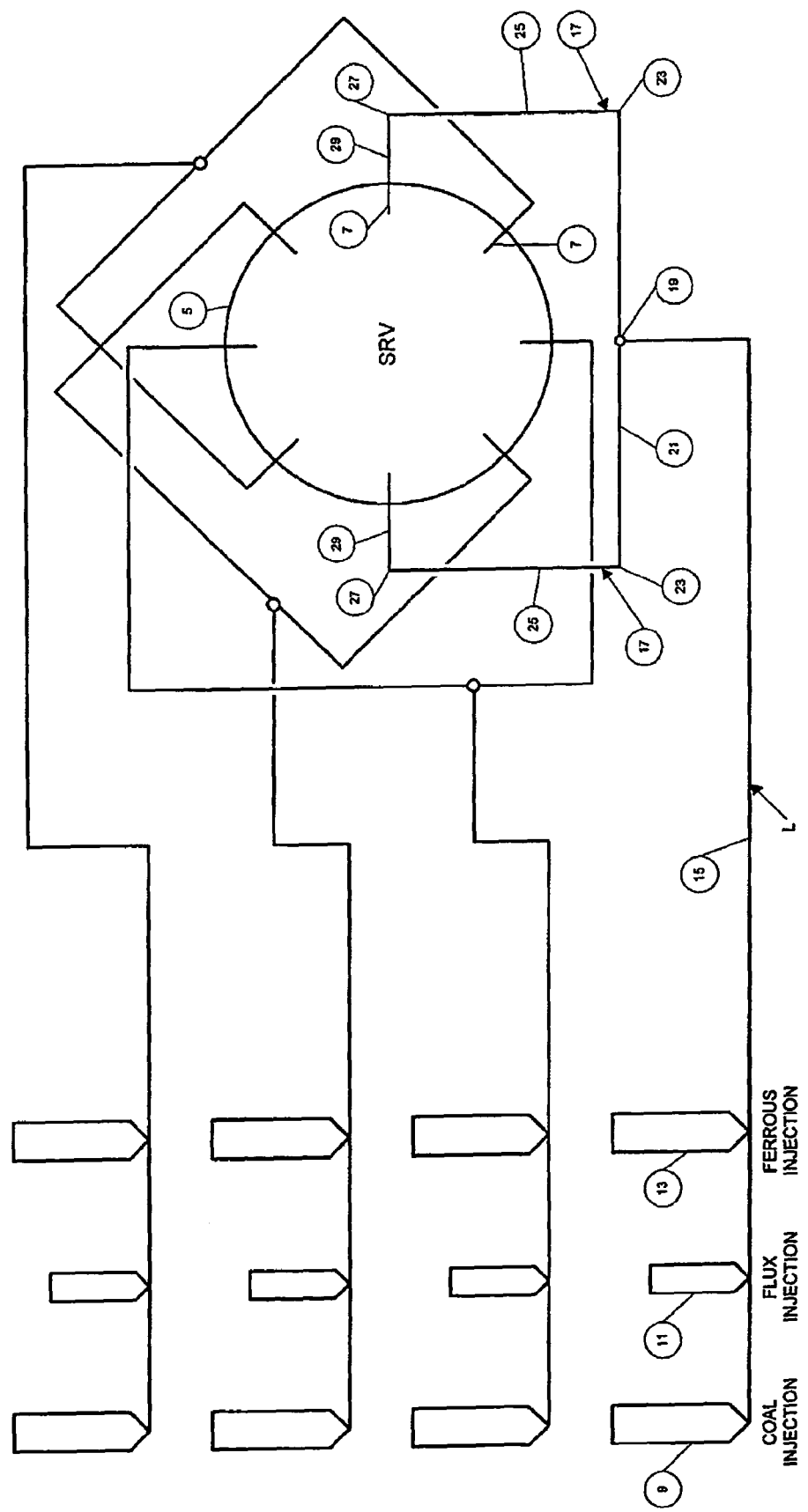
FIG. 1 illustrates in diagrammatic form a preferred embodiment of the feed materials supply apparatus in accordance with the present invention.

FIG. 1 illustrates a feed material supply apparatus for supplying solid feed materials, namely coal, flux and iron ore, and carrier gas to 8 solids injection lances 7 that extend through the side wall 5 of a direct smelting vessel SRV and downwardly and inwardly into the vessel.

The direct smelting vessel SRV may be any suitable vessel for carrying out a direct smelting process such as the HIsmelt process described above.

Australian patent application 27990/01 in the name of the applicant includes a description of the general construction of a HIsmelt vessel and the disclosure in the Australian patent application is incorporated herein by cross-reference.

In basic terms, the HIsmelt vessel described in Australian patent application 27990/01 has: a hearth that includes a base and sides formed from refractory bricks; side walls which form a generally cylindrical barrel extending upwardly from the sides of the hearth and include an upper barrel section and a lower barrel section; a roof; an outlet for offgases; a forehearth for discharging molten metal continuously; and a taphole for discharging molten slag.

In use, the vessel contains a molten bath of iron and slag which includes a layer of molten metal and a layer of molten slag on the metal layer.

The vessel is fitted with a downwardly extending gas injection lance for delivering a hot air blast into an upper region of the vessel and eight solids injection lances, identified by the numeral 7 in the figures, extending downwardly and inwardly through the side walls and into the slag layer for injecting iron ore, solid carbonaceous material, and fluxes entrained in an oxygen-deficient carrier gas into the metal layer.

The gas injection lance receives an oxygen enriched hot air flow through a hot gas delivery duct which extends from a hot gas supply station located some distance away from the reduction vessel.

The position of the solids injection lances 7 is selected so that their outlet ends are above the surface of the metal layer during operation of the process. This position of the lances reduces the risk of damage through contact with molten metal and also makes it possible to cool the lances by forced internal water cooling without significant risk of water coming into contact with the molten metal in the vessel.

The feed materials supply apparatus is arranged to supply coal, flux and iron ore to diametrically opposed pairs of the solids injection lances 7.

Figure 2:
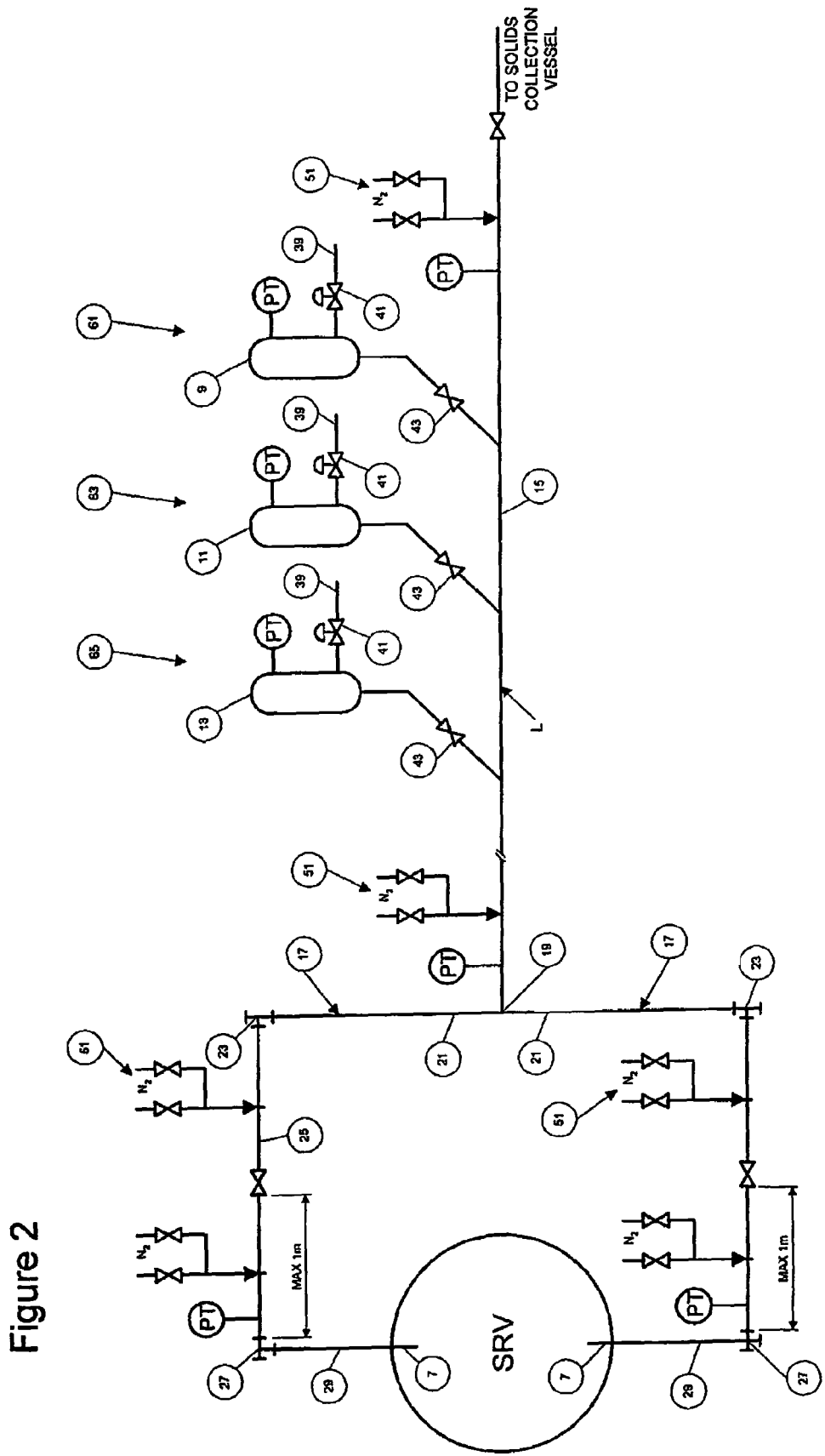
FIG. 2 illustrates in detail in diagrammatic form one unit of the feed materials supply apparatus shown in FIG. 1.

The feed materials supply apparatus for each pair of solids injection lances 7 includes:

(a) a series of feed material dispensing assemblies, namely a coal dispensing assembly generally identified by the numeral 61 in FIG. 2, a flux dispensing assembly generally identified by the numeral 63 in FIG. 2, and an iron ore dispensing assembly generally identified by the numeral 65 in FIG. 2, and (b) a supply line generally identified by the letter L that conveys the feed materials to the lances 7.

More particularly, there is a separate supply of each of coal, flux, and iron ore for each of the 4 pairs of lances 7. In other words, the apparatus includes 4 independent feed materials supply units for supplying the feed materials to the lances 7. Consequently, the apparatus ensures a high level of reliability for the direct smelting process.

Specifically, should one or more of the units be non-operational the remaining unit or units can continue to supply each of the feed materials, optionally at increased feed rates to compensate for the reduction in feed material supply through the non-operational unit or units.

The feed material dispensing assemblies vessels 61, 63 and 65 include pressurized vessels 9, 11, 13 that are constructed to dispense the respective solid feed materials with a carrier gas, typically nitrogen, into the supply lines L.

With regard to FIG. 2, the carrier gas is supplied under pressure to the dispensing vessels 9, 11, 13 via gas supply lines 39.

In addition, the feed material dispensing assemblies 61, 63 and 65 includes valves 41 that control the flow of gas discharged from the dispensing vessels 9, 11, 13 into the supply lines L.

In addition, the feed material dispensing assemblies include lock hoppers (not shown) for supplying the respective feed materials to the dispensing vessels 9, 11, 13 and bulk storage bins (not shown) for supplying feed materials to the lock hoppers.

The supply lines L have an abrasion resistant liner selected to survive a direct smelting campaign, typically 12 months.

In order to minimise manufacture and operating costs, desirably the supply lines L are the minimum possible lengths.

Each supply line L includes a single main feeder line 15 connected to the dispensing vessels 9, 11, 13, a junction 19 connected to a downstream end of the feeder line 15, and a pair of branch lines 17 extending from the junction 19 and connected to the lances 7. One branch line 17 is connected to one of the lances 7 and the other of the branch lines 7 is connected to the other of the lances 17.

The dispensing vessels 9, 11, 13 are connected separately to each feeder line 15, with the coal dispensing vessel 9 being connected upstream of the other vessels 11, 13 and the flux dispensing vessels 11 being connected upstream of the iron ore dispensing vessels 13.

The coal storage vessels 9 are connected upstream of the other vessels 11, 13 because the natural properties of coal assist in facilitating the conveying of solid feed materials in the supply lines L.

The junctions 19 may be any suitable type of feed splitter. One suitable junction is a Clyde splitter box.

In use, one or more of coal, flux, and iron ore are supplied under pressure with carrier gas from the respective dispensing vessels 9, 11, 13 into the feeder lines 15 and are conveyed via the feeder lines 15 and the branch lines 17 to the solids injection lances 7.

The arrangement is such that, depending on process requirements, at any given time, only one of the feed materials, or a blend of two of the feed materials, or a blend of the 3 feed materials are conveyed via the feeder lines 15 and the branch lines 17 to the solid injection lances 7.

Each given pair of branch lines 17 is constructed to have the same configuration of straight sections and bends and pipe diameters so that there is substantially equal resistance to mass flow of feed materials through each branch line 17 from the junctions 19 to the lances 17.

In the arrangement shown in the Figures, each branch line 17 includes a first straight section 21, a first T-bend 23, a second straight section 25, a second T-bend 27, and a third straight section 29.

Figure 3:
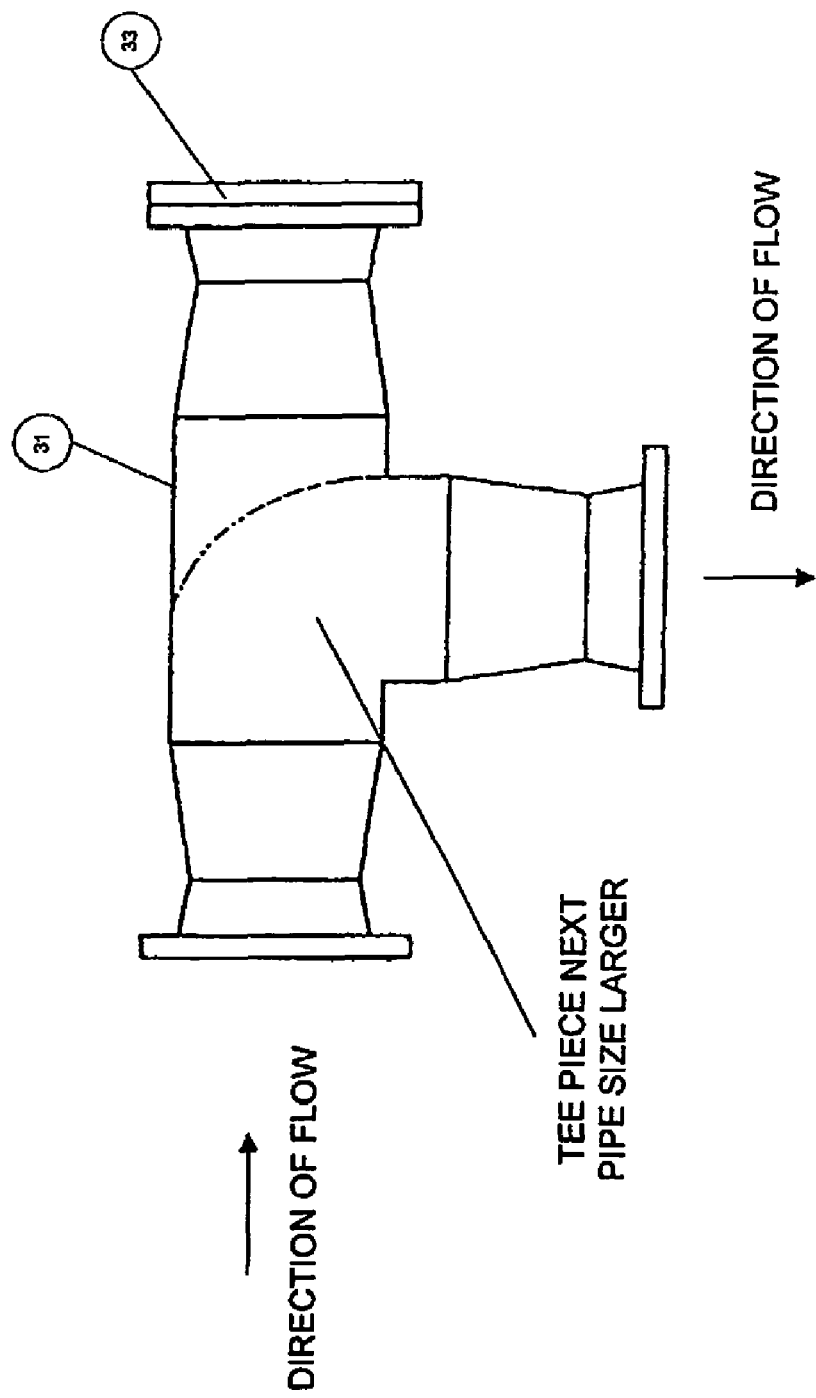
FIG. 3 is a side elevation of a preferred embodiment of a bend in the supply line of the feed materials apparatus shown in FIGS. 1 and 2.

With reference to FIG. 3, the T-bends 23, 27 are 90 degrees expanded T-bends that have dead-end sections 31 that can be accessed via a port 33.

The branch lines 17 are constructed so that the length of the third straight sections 29, ie the sections that are connected to the lances 7, are not less than 10 pipe diameters. This ensures that the highest wear region of the branch lines 17, which is typically 2-7 pipe diameters downstream of the second T-bends 27, is external to the solids injection lances 7.

On the basis of experimental work carried out by the applicant, preferred operating parameters are as follows:

Solids:Gas Ratio

|  | Min | Nominal | Max |
|---|---|---|---|
| Solids:Gas ratio | 10 kg/Nm$^3$ | 15 kg/Nm$^3$ | 18 kg/Nm$^3$ |

Conveying Velocity

| Material | Min | Nominal | Max** |
|---|---|---|---|
| coal/coke breeze | 8 m/s | 10 m/s | 16 m/s |
| ore/reverts/DRI | 10 m/s | 12 m/s | 16 m/s |
| flux/dust | 8 m/s | 10 m/s | 16 m/s |

**This is the normal operating maximum. Short term (<1 hour) excursions about these values will be possible.

Minimum Pressure Head (Based on Gas Properties Only)

| Material | Min |
|---|---|
| coal/coke breeze | 300 Pa |
| ore/reverts/DRI | 300 Pa |
| flux/dust | 300 Pa |

In general terms, the objective of the selection of operating parameters is to operate at as low as possible gas velocity to minimise carrier gas volumes and line wear, bearing in mind that the risk of line blockages increases as the velocity decreases.

The apparatus also includes a means for detecting and unblocking blockages in supply lines L.

With reference to FIG. 2, the detecting/unblocking means includes pressure measurement equipment PT in each of the dispensing vessels 9, 11, 13, the feeder lines 15, and the branch lines 17. The detecting/unblocking means also includes a data processing system (not shown) for processing measured pressures and determining pressure differentials and, more particularly, whether pressure differentials are outside prescribed ranges, thereby indicating a line blockage.

With further reference to FIG. 2, the detecting/unblocking means also includes assemblies 51 for pressurising/venting the supply lines L at a number of points along the length of the supply lines L for unblocking line blockages.

In use, when a blockage is detected in a supply line L, valves 43 are closed to prevent continued supply of feed materials to a blocked supply line L and pipework on both sides of a blockage is pressurised by supplying gas via the pressurising/venting points 51 and then one side of the blockage is vented quickly to atmosphere. The applicant has found that this technique is an effective means of clearing line blockages.

Many modifications may be made to the preferred embodiment of the present invention described above without departing from the spirit and scope of the present invention.

In this regard, it is understood that the control means associated with the dispensing vessels 9, 11, 13 may be a mechanical feed system or a pressure system using differential pressure or any combination thereof.

What is claimed is:

1. A process for supplying solid feed materials to a bath of molten iron and slag of a direct iron smelting process located in a direct smelting vessel, the solids feed materials supplied through solids injection lances to said direct smelting vessel, the process of supplying solid feed materials to said bath comprising the steps of:
   (a) supplying solid feed materials entrained in an oxygen deficient carrier gas to pairs of solids injection lances via a plurality of supply lines, with one supply line being connected to each pair of solids injection lances and the lances of each pair being located on diametrically opposed locations on the vessel, wherein each lance of said pair of lances extends downwardly and inwardly through a side wall of the vessel and has outlet ends at a level that is within the slag layer and above the iron layer, and wherein each of said supply lines has a main feeder line section and two branch line sections extending from the main feeder line section, with each branch line section being connected to one lance of said pair of lances;
   (b) dispensing one or more of iron-containing materials or carbonaceous material under pressure into each of the main feeder line sections from a dispensing assembly including a pressurized vessel; and
   (c) injecting said solids feed materials entrained in said oxygen deficient carrier gas through said solids injection lances into said iron layer of said bath of molten iron and slag of said direct iron smelting process.

2. The process defined in claim 1, including maintaining the same mass flow rate of solid feed materials to each lance.

3. The process defined in claim 1, wherein the solid feed materials include one or more of iron-containing material, carbonaceous material, and flux.

4. The process defined in claim 3, wherein the iron-containing material is substantially fine material of less than 6 mm diameter.

5. The process defined in claim 4, wherein the carbonaceous material is substantially fine material of less than 3 mm diameter.

6. The process defined in claim 1, including supplying solid feed materials and carrier gas into each of the main feeder line sections via separate dispensing assemblies for each feed material.

7. The process defined in claim 1, including maintaining a pressure head of at least 250 Pa at the dispensing assembly end of each of the main feeder line sections of the supply line.

8. The process defined in claim 1, including supplying solid feed materials and carrier gas in the supply line at a solids:gas ratio of at least 10 kg solids/Nm$^3$ gas.

9. The process defined in claim 1, including supplying the following feed materials into the supply line at the following minimum velocities:

| Material | Minimum Velocity m/s |
|---|---|
| Coal/coke breeze | 8 |
| Ore/partially reduced iron ore DRI/steel plant wastes | 10 |
| Flux | 8. |

* * * * *